United States Patent [19]
Kaneski et al.

[11] Patent Number: 5,836,321
[45] Date of Patent: Nov. 17, 1998

[54] PROCESS OF RECYCLING A WATER LADEN SOLVENT WHICH WAS USED TO PURGE A POINT SUPPLY LINE OF A PAINT SPRAYER

[75] Inventors: Donald E. Kaneski, Fenton; David R. Powell, Kirkwood, both of Mo.

[73] Assignee: Chrysler Corporation, Auburn Hills, Mich.

[21] Appl. No.: 835,369

[22] Filed: Apr. 7, 1997

[51] Int. Cl.$^6$ ........................................................ B08B 7/04
[52] U.S. Cl. ...................... 134/10; 134/22.11; 134/22.12; 134/38; 134/110; 134/111; 134/166 R; 134/166 C; 210/805; 210/650; 210/651
[58] Field of Search ..................................... 210/649, 650, 210/651, 652, 930, 97, 167, 172, 194, 195.2, 196, 257.2, 805, 767; 134/10, 22.1, 22.11, 22.12, 38, 109, 110, 111, 166 R, 167 R, 166 C

[56] References Cited

U.S. PATENT DOCUMENTS

| | | |
|---|---|---|
| 2,745,418 | 5/1956 | Balcom et al. . |
| 3,528,901 | 9/1970 | Wallace et al. . |
| 4,025,363 | 5/1977 | De Santis . |
| 4,100,066 | 7/1978 | Bloomer et al. . |
| 4,265,642 | 5/1981 | Mir et al. . |
| 4,331,525 | 5/1982 | Huba et al. ............................... 210/650 |
| 4,378,235 | 3/1983 | Cosper et al. ........................... 210/712 |
| 4,607,592 | 8/1986 | Richter . |
| 4,849,106 | 7/1989 | Mir . |
| 4,934,393 | 6/1990 | Lighthall et al. . |
| 5,009,789 | 4/1991 | Helmer et al. . |
| 5,092,928 | 3/1992 | Spangler . |
| 5,282,970 | 2/1994 | Wepf . |
| 5,292,547 | 3/1994 | Schlumpf et al. . |
| 5,319,017 | 6/1994 | Uenoyama et al. . |
| 5,393,390 | 2/1995 | Freese et al. . |
| 5,443,738 | 8/1995 | Bhatnagar et al. . |
| 5,490,939 | 2/1996 | Gerigk et al. . |
| 5,492,626 | 2/1996 | Uenoyama et al. . |
| 5,554,296 | 9/1996 | Zakhary ................................... 210/702 |
| 5,569,384 | 10/1996 | Saatweber et al. . |

Primary Examiner—Robert Popovics

[57] ABSTRACT

A system is provided for recycling a water ladened solvent used for purging a paint supply line of a paint sprayer. The purged material including a mixture of water ladened solvent and paint is filtered for separating the water ladened solvent from the paint. The water ladened solvent is collected and then reused for purging the paint supply lines of the paint sprayer.

3 Claims, 1 Drawing Sheet

PROCESS OF RECYCLING A WATER LADEN SOLVENT WHICH WAS USED TO PURGE A POINT SUPPLY LINE OF A PAINT SPRAYER

BACKGROUND OF THE INVENTION

FIELD OF THE INVENTION

The present invention relates to a system for recycling the water ladened solvent used for purging the paint supply lines of a paint sprayer for additional purging.

BACKGROUND AND SUMMARY OF THE INVENTION

In the field of spray-coating an article within a coating booth, it is often necessary to purge the paint spray line in order to change the color of paint being applied. Currently, equipment is used for separating oil and water and electrocoal primer and water. However, there is no current application for separating waterborne paint and solvent/water. The current practice is to dump spent paint directly into the paint spray booth water system. The water must then be treated at considerable cost to remove paint solids for disposal. An additional problem related to the dumping of the paint in the water is that the system becomes caked and plugged with paint solids adding to the maintenance cost. Additionally, all solvents are lost because of an inability to separate the solvent out of the water.

The system of the present invention eliminates the above shortcomings and allows the reuse of the water ladened solvent for additional purging of the paint supply lines.

According to the present invention, a system is provided for recycling a water ladened solvent used for purging a paint supply line of a paint sprayer. The system includes a purge supply line connected to the paint supply line. A purge collection passage is provided for receiving purged material from the paint sprayer. A spent purge collection vessel receives the purged material from the purged collection passage. An ultrafiltration unit is provided for separating water ladened solvent from the purged material. A storage vessel is provided for receiving the filtered water ladened solvent from the ultrafiltration unit. The water ladened solvent in the storage vessel is then reused for purging the paint supply line.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
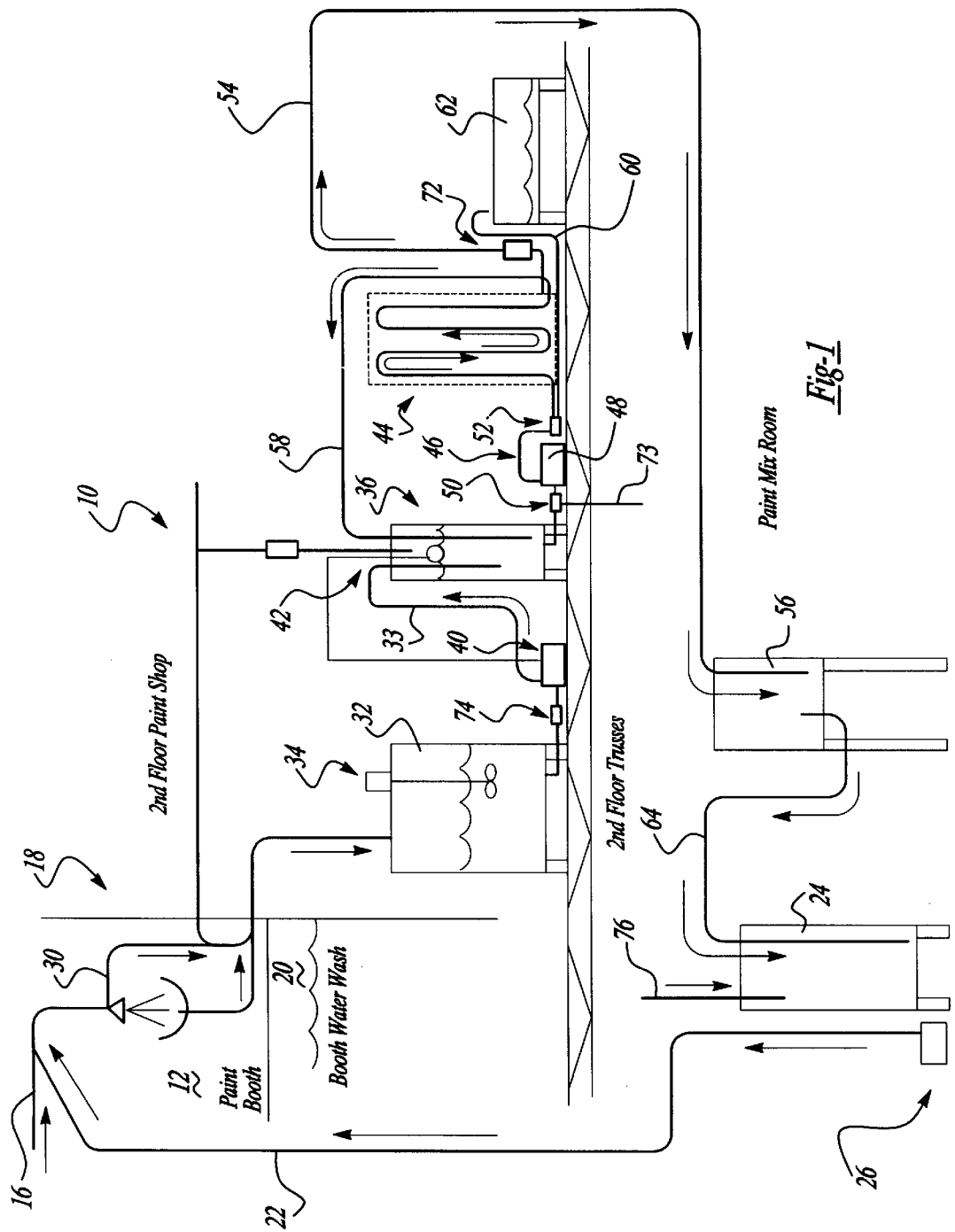
FIG. 1 is a schematic of the system for recycling a water ladened solvent used for purging a paint supply line according to the principles of the present invention.

With reference to FIG. 1, the system and method for recycling a water ladened solvent used for purging a paint supply line of a paint sprayer will be described. The recycling system 10 is used in conjunction with a paint spray booth 12 having a paint sprayer 14 connected to a paint supply line 16 for painting objects within the paint spray booth 12. Typically, the paint spray booth 12 is provided with side walls 18 and a booth water wash system 20 which receives the paint overspray from the paint spray booth 12.

According to the present invention, a purge supply line 22 is connected to the paint supply line 16 for purging the paint supply line 16 and sprayer 14. The purge supply line 22 is connected to a main purge supply tank 24 which contains the water ladened solvent which is utilized for purging the paint supply line 16 and sprayer 14. A pump 26 is provided for delivering the water ladened solvent from the main purge supply tank to the purge supply line 22. As the paint supply line 16 and sprayer 14 are purged, the purge material including water ladened solvent mixed with paint are collected and delivered through passages 28 and 30 to spent purge collection tank 32. Spent purge collection tank 32 is provided with an agitator 34 which includes a motor driven mixing device for preventing settlement of the paint within the spent purge collection tank 32.

The spent purge collection tank 32 is connected to a process supply tank 36 via fluid passage 38. A pump 40 is provided in fluid passage 38 and is automatically actuated by float valve 42 when the fluid level in the process supply tank 36 reaches a predetermined level. Thus, when the fluid level in the process supply tank 36 becomes too low, the float valve 42 will actuate pump 40 to fill the process supply tank 36 with purge material. The purged material in the process supply tank 36 will then be cycled through an ultrafiltration processing unit 44. The ultrafiltration processing unit 44 is a known unit which is currently patented by Koch Membrane Systems, Inc., under U.S. Pat. No. 4,849,106.

The ultrafiltration processing unit 44 is connected to the process supply tank 36 by supply line 46. Supply line 46 is provided with a pump 48 for pumping the purged material through the ultrafiltration processing unit 44. Supply line 46 is provided with a first valve 50 which is capable of diverting the fluid in the process supply tank 36 to an industrial waste system. A second valve 52 is provided in supply line 46. Water ladened solvent will pass through the membranes of the ultrafiltration processing unit 44 and into a recycled purge return line 54 which delivers the water ladened solvent to the recycled purge stabilization tank 56. Paint solids will cycle back to the supply tank 36 through process return line 58 for additional passes through the ultrafiltration processing unit 44. The purged material in the process supply tank 36 will continue to be cycled through the ultrafiltration unit until a predetermined amount of the water ladened solvent can be removed. According to a preferred embodiment, at least 50–65% of the water ladened solvent will be removed from the purged material. At this point, the waste paint becomes a heavy slurry or sludge and is diverted by valve 52 through a passage 60 to a sludge collection tank 62 for disposal.

During the filtration process, some foam develops as the water ladened solvent passes through the membranes of the ultrafiltration processing unit 44 and from other mechanical forces. The foam subsides in the stabilization tank 56, after which, the recycled water ladened solvent is introduced, via passage 64, back into the main purge supply tank 24 for reuse. Due to the fact that all of the water ladened solvent cannot be recovered from the purged material, a supply line 76 is provided for supplying unrecycled water and solvent to the main purge supply tank 24.

Tap water can also be used for flushing and cleaning the system components. For example, passages 68, 70 are provided for delivering tap water for flushing and cleaning the spent purge collection tank 32, process supply tank 36 and ultrafiltration processing unit 44 as well as the passages connecting therebetween. A valve 72 is provided in recycled purge return line 54 for closing recycled purge return line 54 and preventing the flush/cleaning water from being mixed with the recycled water ladened solvent which is delivered to recycled purge stabilization tank 56. Valve 50 is utilized for allowing the flushing/cleaning water to be drained into the industrial waste system via passage 73. An additional valve 74 can be provided in fluid passage 38 for maintenance purposes. In particular, valve 74 can be closed to allow maintenance on pump 40 without requiring spent purge collection tank 32 to be emptied.

The system of the present invention utilizes gravity forces to carry the purged material through purge collection lines 28, 30.

In operation, the paint supply line 16 and sprayer 14 are purged by activating pump 26 to force water ladened solvent through purge supply line 22. The purged material including water ladened solvent mixed with paint is collected by purge collection lines 28, 30 and delivered to spent purge collection tank 32. The agitator 34 keeps the paint in the purged material from settling to the bottom of the collection tank 32. Pump 40 is actuated to deliver purged material from the spent purge collection tank 32 through fluid passage 38 to process supply tank 36. Pump 48 is actuated to cycle the purged material from process supply tank 36 through ultrafiltration processing unit 44 for separating the water ladened solvent from the paint. The filtered water landed solvent is directed through recycled purge return line 54 to the recycled purge stabilization tank 56. The paint is returned to the process supply tank 36 through process return line 58 so that the purged material can be continually passed through the ultrafiltration processing unit 44 until a desired amount of the water ladened solvent is removed. When the paint becomes a heavy slurry or sludge the paint is cycled into the sludge collection tank 62 for disposal. At this time, the float valve 42 would actuate pump 40 to refill process supply tank 36 for processing. The water ladened solvent in the stabilization tank 56 is then delivered to the main purge supply tank 24 via recycled purge line 64. The recycled water ladened solvent is then mixed with unrecycled water and solvent supplied via passage 76.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of recycling a water ladened solvent used for purging a paint supply line of a paint sprayer, comprising the steps of:

purging a paint supply line with water ladened solvent;

collecting purged material including a mixture of water ladened solvent and paint;

agitating said purged material within a vessel for preventing settlement of paint within said vessel;

filtering said purged material for separating said water ladened solvent and said paint;

collecting said water ladened solvent separated from said purged material; and purging said paint supply line using water ladened solvent separated from said purged material.

2. The method according to claim 1, further comprising the step of adding unrecycled water and solvent to said water ladened solvent separated from said purged material.

3. A method of recycling a water ladened solvent used for purging a paint supply line of a paint sprayer, comprising the steps of:

(a) purging a paint supply line with water ladened solvent;

(b) collecting purged material including a mixture of water ladened solvent and paint in a vessel;

(c) filtering said purged material for separating said water ladened solvent from said purged material;

(d) recycling remaining purged material from said filtering step to said vessel;

(e) repeating steps (c) and (d) until a desired amount of water ladened solvent is removed from said purged material;

(f) collecting said water ladened solvent separated from said purged material; and (g) purging said paint supply line using water ladened solvent separated from said purged material.

\* \* \* \* \*

UNITED STATES PATENT AND TRADEMARK OFFICE
CERTIFICATE OF CORRECTION

PATENT NO : 5,836,321
DATED : November 17, 1998
INVENTOR(S): Donald E. Kaneski et al It is certified that error appears in the above-identified patent and that said Letters Patent is hereby corrected as shown below:

On title page, and col. 1, line 3, in the title of the invention, please delete "POINT" and insert --PAINT-- therefor.

Signed and Sealed this

Seventh Day of September, 1999

Q. TODD DICKINSON

Attest:

Attesting Officer

Acting Commissioner of Patents and Trademarks